April 21, 1942. E. A. GLYNN 2,280,430
METHOD OF AND MEANS FOR REMOVING A TIRE FROM A MOLD
Filed Feb. 24, 1939 2 Sheets-Sheet 1
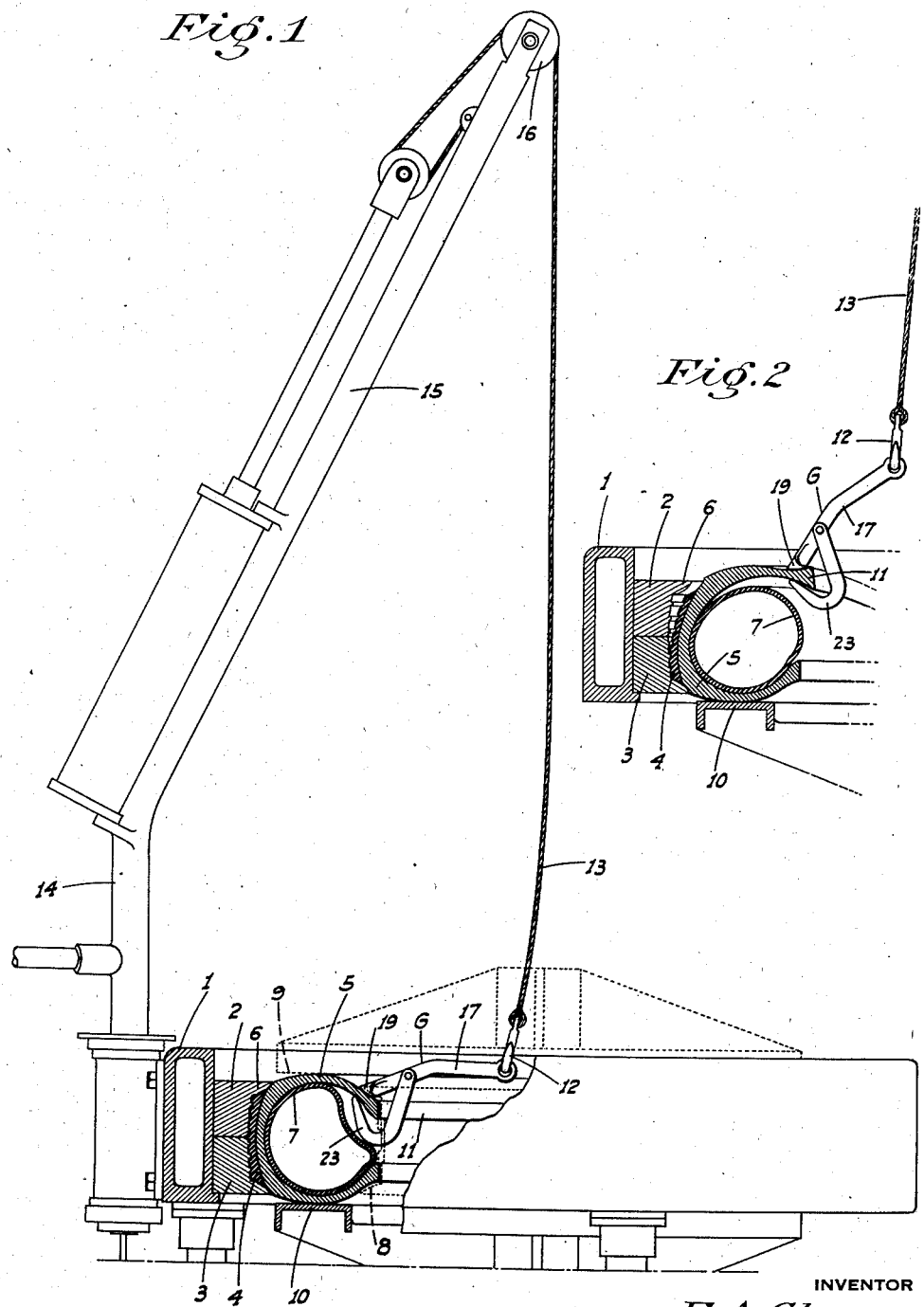
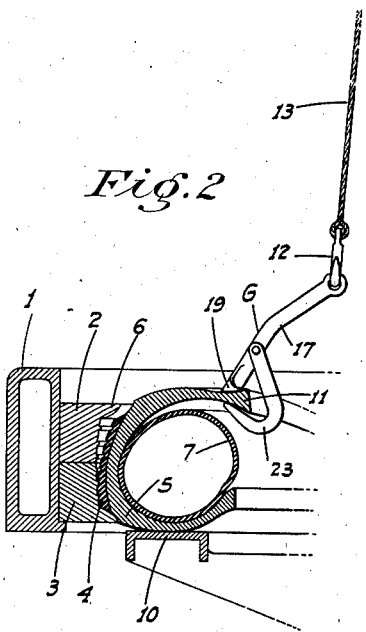
INVENTOR
E. A. Glynn
BY
ATTORNEY April 21, 1942.   E. A. GLYNN   2,280,430
METHOD OF AND MEANS FOR REMOVING A TIRE FROM A MOLD
Filed Feb. 24, 1939   2 Sheets-Sheet 2

INVENTOR
E. A. Glynn
BY
ATTORNEY

Patented Apr. 21, 1942

2,280,430

UNITED STATES PATENT OFFICE 2,280,430

METHOD OF AND MEANS FOR REMOVING A TIRE FROM A MOLD

Edwin A. Glynn, Lodi, Calif., assignor to Super Mold Corporation of California, a California corporation Application February 24, 1939, Serial No. 258,234

7 Claims. (Cl. 18—2)

This invention relates to tire retreading, and particularly to the removal of the tire from the vulcanizing mold after the vulcanizing operation is completed.

More specifically, this invention deals with the removal of a tire from a mold of the full circle horizontal type such as is now in wide use. A mold of this type includes upper and lower matrix sections separable from each other and formed with side skirts overlapping the sides of the tire, so that the latter cannot be lifted directly from a matrix engaging position.

Heretofore it has been considered necessary to first disengage the upper matrix section from the tire and then remove said section from the mold body (as in the manner shown in my copending application, Ser. No. 195,991, filed March 15, 1938) and then pull the tire clear of the lower matrix section by attaching a hoist cable to the rim on which the tire is mounted during vulcanization.

While this method is effective, it has an objectionable feature in that it consumes considerable time and the removed matrix section, when disengaged from the heated mold body for any length of time, cools off rapidly, and a further loss of time occurs in reheating the matrix for the next tire to be vulcanized.

The principal object of this invention therefore is to avoid the above objectionable features by the provision of a method whereby the tire may be easily and quickly removed from the matrix sections without removing the latter. A further object is to provide an efficient means for carrying out the above method.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a fragmentary side view of a vulcanizing mold, partly in section, and showing the tire as initially engaged by the removing means.

Figure 2 is a fragmentary radial section of the mold and tire showing the tire as being pulled clear of the matrix.

Figure 3:
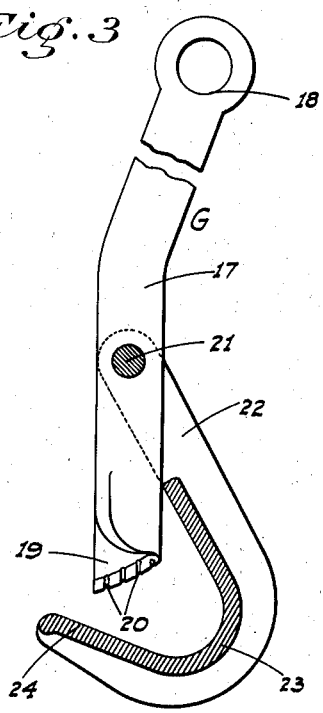
Figure 3 is a side view, partly in section, of the preferred form of tire engaging hook or grapple.

Referring now more particularly to the characters of reference on the drawings, the mold with which I practice my method comprises a horizontal mold body 1, adapted to surround and support upper and lower matrix sections 2 and 3 respectively these sections engaging the tread portion 4 of a tire 5, and having side skirts 6 overlapping the sides of the tire and extending radially inward of the tread portion 4.

When the tire is to be vulcanized, it is provided with an inflated air bag 7, and is mounted on an adjustable two-part rim, indicated at 8 and of the type shown in Patent No. 2,077,506, dated April 20, 1937. When in the mold, the sides of the tire radially inward of the matrix sections, are engaged by upper and lower pressure plates indicated at 9 and 10 respectively, the upper pressure plate being removable by direct upward movement.

When it is desired to remove a tire, employing my method, the matrix sections remain undisturbed in the mold. The air bag 7 is deflated, however, and the upper pressure plate 9 is then withdrawn clear of the mold and deposited to one side of the same. The parts of the rim are then disengaged from each other and the upper part is withdrawn from the mold; the lower part of the rim dropping away from the tire and resting on the radial ribs of the lower pressure plate.

This leaves the upper bead 11 and the adjacent side wall portion of the tire freely exposed, so that said portion adjacent the bead may be engaged and gripped by a grapple indicated generally at G.

This grapple is removably attached to the hook 12 of a pull cable 13, depending from a hoist 14. While not essential to the carrying out of my method, this hoist is preferably mounted on the mold body 1 as shown, and is of the hydraulic type featured in my copending application, Serial No. 117,304, filed December 23, 1936. This hoist includes an arm or mast 15 swingable about a vertical axis and disposed so that its upper end, on which the cable guiding pulley 16 is mounted, may aline with the vertical axis of the mold.

Since the grapple engaged area of the tire is of course radially out some distance from such vertical axis, in which the cable is also disposed, an upward pull on the cable will exert both an upward and a radially inward pulling pressure on the adjacent portion of the tire.

As an initial result, the adjacent portion of the tire is temporarily distorted or pulled out of shape, causing the adjacent tread portion to pull away from the upper matrix section, as shown in Fig. 2. A continuation of the pull on the cable ultimately causes the entire tire to be pulled out of the matrix—a result which follows easily once the tire is initially pulled out at one point as above described, and due to the fact that the pull of the tire is concentrated at the one point throughout the removing operation. Carrying out of the above method is of course rendered feasible by the fact that the tire in a deflated and unmounted condition is flexible and readily deformable.

Also the fact that the tire beads become initially spread apart by the pull on the grapple, enables the air bag to be withdrawn at that time instead of necessitating the use of a spreader for the tire after it is removed, as must sometimes be done.

Figure 4:
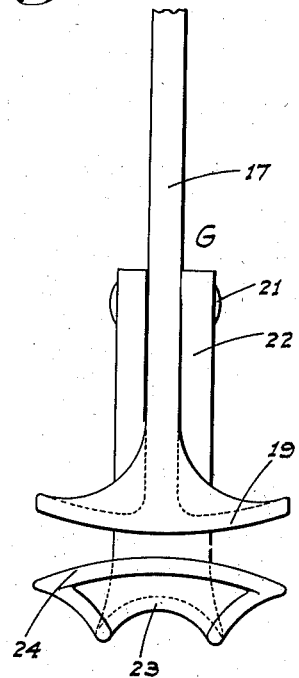
Figure 4 is a front view of the same.

The preferred form of grapple is illustrated in Figs. 3 and 4. This comprises a shank 17 formed intermediate its ends with an acute angle bend, and provided at its upper end with a cable-hook eye 18. At the lower end, the shank is provided with a crosshead 19 having a longitudinal convex curvature on its under face. In a transverse direction, the head is formed with a convex curvature and slopes upwardly in the direction of the bend of the shank. The crosshead is longitudinally grooved as at 20 or otherwise treated to provide a non-slip grip.

Pivoted by a cross pin 21 mounted in the shank between the crosshead and the bend is the forked shank 22 of a hook 23 arranged to cooperate with the crosshead; this shank projecting from the same side of shank 17 as the bend therein. The hook has a somewhat deep throat and is arranged relative to its shank and to shank 17 so that when the shank 22 is bearing at the lower end of the fork against the adjacent edge of the shank 17, the crosshead is located in the throat of the hook, with clearance less than the thickness of the sidewall of a tire between the lowest edge of the crosshead and the point of the hook, as shown in Fig. 3. The upper or working face of the hook is as wide as the crosshead, and said face is convexly curved as shown, or so that its curvature is opposed to that of the crosshead as shown in Fig. 4. The working faces of the crosshead and that of the outer longitudinally flat lip portion 24 of the hook are shaped and disposed relative to each other so that they diverge inwardly of the hook, and thus have a firm frictional and wedging grip with the sidewall of a tire just above the relatively large bead thereof, which is retained without being mutilated in the throat of the hook beyond the crosshead, as plainly shown in Fig. 1.

To engage the grapple with the tire, the hook is swung away from shank 17 so as to increase the space between the crosshead and lip 24 so that the grapple may straddle the tire bead. The grapple is initially held nearly horizontal, with the crosshead on top and the hook entering the tire between the beads; the angle of divergence between the hook-lip and crosshead being then decreased with the increase in spacing therebetween. The air bag must of course be pushed out of the way at this point, but being deflated and relatively limp, this offers no resistance.

When the grapple is first applied and while the cable 13 is still slack, it may be necessary to hold the grapple in position by hand. However, as soon as an upward pull is applied to the grapple, tending to move the shank 17 to a vertical position, the hook swings of itself toward shank 17 and into relative clamping cooperation with the crosshead. The harder the pull, the greater will be the tendency of the hook to relatively move toward the shank, so as to further reduce the width of the gap between the hook-lip and crosshead and increasing the tire clamping action.

The above described grapple is particularly for use with the very flexible four or six ply tires such as are commonly used on automobiles. This form of grapple prevents the same from slipping off the beads of the tire as the side walls thereof become quite considerably flexed with the pulling of the tire from the mold.

The purpose of the convexity of the clamping faces in a longitudinal direction (which is circumferentially of the tire) is to avoid presenting any abrupt edges to the tire which might tend to cut into the same as the tire is temporarily distorted with the upward pull on the grapple.

Figure 5:
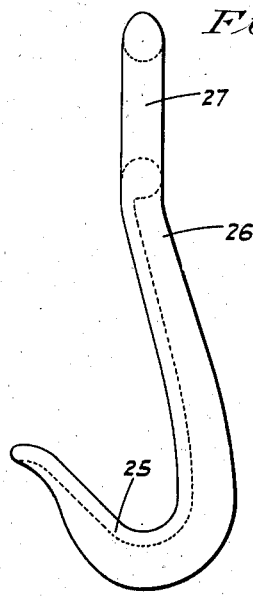
Figures 5 and 6 are side and front views respectively of a modified form of hook.
Figure 6:
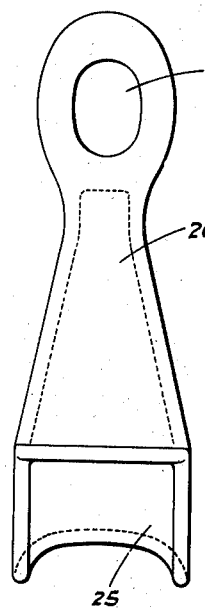

In Figs. 5 and 6 I have illustrated a simpler form of tire engaging member. This member is in the form of a simple relatively wide hook 25, adapted to engage under the upper bead of the tire, and whose relatively long shank 26 is provided with a cable-hook engaging eye 27. This hook is obviously somewhat easier to apply than the grapple, but is mainly intended to be used with only heavy stiff tires. This hook will not slip from engagement with the beads of such tires, since due to their stiffness the side walls cannot be distorted very far from their normal shape.

With either form of hook it will be noted that as an upward pull is exerted on the tire from the outer end of the hook shank, the upper side wall of the tire where radially alined with the hook, may be considered as a lever arm, initially fulcrumed at the point of engagement of the upper matrix skirt 6 with the tire. As a result, this lever arm portion of the tire, when initially pulled up by the cable, has a tendency to swing the adjacent tread portion of the tire radially in and away from the matrix design; and the new tread rubber comes away from the matrix design cleanly and without any tendency to be merely dragged therefrom in a direction transversely of the tire and matrix.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. The method of removing a tire from the surrounding matrix of a vulcanizing mold after deflating the air bag and removing the mounting rim of the tire, comprising exerting a pull on the tire at a point and adjacent one bead thereof in a direction both radially inward and axially of the tire away from the opposite bead, and continuing such pull until the tire is clear of the matrix throughout its extent.

2. Means to remove a tire from the surrounding matrix of a horizontal vulcanizing mold comprising an element to engage and grab the tire at one point adjacent its uppermost bead, and means to pull said element in a combined upward and radially inward direction relative to the vertical axis of the tire.

3. Means to remove a tire from the surrounding matrix of a horizontal vulcanizing mold comprising a hook adapted to be inserted into the tire between the beads thereof and to receive the upper bead at one point therein, a member mounted in unitary connection with the hook and cooperating therewith to approach close to the point of the hook and pass inside the hook opening so as to clamp the tire adjacent said bead therebetween, the member at its end farthest from the point of the hook being adapted for connection with a pull cable.

4. Means to remove a tire from the surrounding matrix of a horizontal vulcanizing mold comprising a hook adapted to be inserted into the tire between the beads thereof and to receive the upper bead at one point therein, a shank on which and intermediate its ends the hook is pivoted, said shank being adapted to approach close to the point of the hook and pass inside the hook opening so as to overlie said upper bead and a crosshead on the lower end of the shank to bear against the tire directly above the hook, the opposite end of the shank being adapted for connection with a pull cable.

5. Means to remove a tire from the surrounding matrix of a horizontal vulcanizing mold comprising a tire engaging grapple comprising a shank adapted to extend radially of the tire and initially in a substantially horizontal direction in overlying relation to the upper sidewall and bead of the tire, a tire engaging crosshead on the radially outer end of the shank and a hook pivoted on the shank intermediate its ends and adapted to enter the tire between the beads to engage the inside of the tire at a point opposite the crosshead, the opposite end of the shank being adapted for connection with a pull cable; the crosshead and hook being shaped and disposed relative to each other to exert an increasing clamping action on the tire with a pull on said opposite end of the shank and a resulting movement of the shank toward a vertical position.

6. A device as in claim 4, in which the adjacent tire engaging faces of the crosshead and hook are convexly curved in a direction at right angles to the line of pull on the shank.

7. Means to remove a tire from the surrounding matrix of a horizontal vulcanizing mold comprising a tire engaging grapple comprising a shank adapted to extend radially of the tire and initially in a substantially horizontal direction in overlying relation to the upper sidewall and bead of the tire, a tire engaging crosshead on the radially outer end of the shank and a hook pivoted on the shank intermediate its ends and adapted to enter the tire between the beads to engage the inside of the tire at a point opposite the crosshead, the opposite end of the shank being adapted for connection with a pull cable, the tire engaging faces of the crosshead and the lip portion of the hook diverging relative to each other inwardly of the hook and the angle of divergence increasing with the swinging of the hook toward the lower portion of the shank, and the smallest width of the gap possible between the crosshead and lip being less than the thickness of the side wall of a tire.

EDWIN A. GLYNN.